United States Patent [19]
Asako

[11] Patent Number: 5,315,674
[45] Date of Patent: May 24, 1994

[54] REPEATERED OPTICAL TRANSMISSION SYSTEM HAVING FULL-OPTICAL LOOPBACK FACILITIES

[75] Inventor: Katsuhiro Asako, Tokyo, Japan

[73] Assignee: NEC Corporation, Japan

[21] Appl. No.: 59,202

[22] Filed: May 7, 1993

[30] Foreign Application Priority Data

May 7, 1992 [JP] Japan .................................. 4-114359

[51] Int. Cl.$^5$ .......................... G02B 6/26; G02F 1/00
[52] U.S. Cl. ........................................ 385/15; 385/24;
 359/174; 359/177; 359/179
[58] Field of Search ...................... 385/15, 16, 17, 24,
 385/122; 359/174, 175, 176, 177, 178, 179;
 356/73.1; 379/2, 4, 5

[56] References Cited
U.S. PATENT DOCUMENTS

| | | |
|---|---|---|
| 4,300,239 | 11/1981 | Wakabayashi et al. ............. 356/73.1 |
| 4,727,592 | 2/1988 | Okada et al. ........................ 359/177 |
| 4,887,309 | 12/1989 | Anderson et al. .................... 359/177 |
| 5,010,544 | 4/1991 | Chang et al. ........................ 370/13.1 |
| 5,224,149 | 6/1993 | Garcia .................................... 379/5 |
| 5,229,876 | 7/1993 | Fatehi et al. ......................... 359/160 |
| 5,245,680 | 9/1993 | Sauter ................................... 385/24 |

Primary Examiner—Frank Gonzalez
Attorney, Agent, or Firm—Ostrolenk, Faber, Gerb & Soffen

[57] ABSTRACT

A repeater station has first and second identical repeaters for amplifying and transmitting optical signals in opposite directions. In each repeater, an optical signal from a first fiber optic transmission line is amplified by a first fiber optic section doped with a substance of rare-earth group by interaction with injected excitation light energy. A second fiber optic section, doped with the same substance and similarly injected with excitation light energy, amplifies the output of the first fiber optic section and transmits it to a second fiber optic transmission line. An optical coupler is connected between the first and second fiber optic sections. A fiber optic loopback circuit of the first repeater is connected at one end through its optical coupler to the output of its first fiber optic section and connected at the other end through the optical coupler of the second repeater to the input of the second fiber optic section of the second repeater. An optical shutter is provided for normally blocking the loopback circuit. In the first repeater, an absence-of-signal detector monitors the first fiber optic transmission line for detecting when there is no optical signal in the first fiber optic transmission line and operating, in response, the shutter of the second repeater to establish a path through its fiber optic loopback circuit and causing the excitation light energy of the second repeater to cease for signalling the emergency to an adjacent repeater station through the second fiber optic transmission line.

3 Claims, 2 Drawing Sheets

REPEATERED OPTICAL TRANSMISSION SYSTEM HAVING FULL-OPTICAL LOOPBACK FACILITIES

BACKGROUND OF THE INVENTION

1. Field of the Invention

The present invention relates generally to repeatered optical transmission systems, and more specifically to a technique for establishing loopback circuits in the event of a failure in a fiber optic transmission medium between adjacent repeater stations.

2. Description of the Related Art

Each repeater station of conventional repeatered fiber optic transmission systems is provided with eastward and westward repeaters. In the eastward repeater, an optical signal arriving at an incoming eastward fiber optic transmission line is converted by a first electrical-to-optical signal transducer to an electrical signal, passed through an electrical switching circuit to a first optical-to-electrical signal transducer where it is converted to an optical signal and forwarded onto an outgoing eastward fiber optic transmission line. Likewise, in the westward repeater an optical signal arriving at an incoming westward fiber optic transmission line is converted by a second electrical-to-optical signal transducer to an electrical signal, passed through the electrical switching circuit to a second optical-to-electrical signal transducer where it is converted to an optical signal and forwarded onto an outgoing westward fiber optic transmission line. If the outgoing eastward fiber optic transmission line should fail between first and second repeater stations, the electrical switching circuit of the first (west-side) station is switched to establish a loopback circuit between the output of the first O/E signal transducer and the input of the second E/O signal transducer so that the eastward optical signal is looped back in the westward direction at the first station, while the switching circuit of the second repeater station is switched to establish a loopback circuit between the output of the second O/E signal transducer and the input of the first E/O signal transducer so that the westward optical signal is looped back in the eastward direction at the second station.

However, the recent development of a direct light amplification technique using a length of optical fiber doped with a substance of the rare-earth group, such as erbium, and a source of excitation light energy to be injected into the doped fiber, is promising a future fiber optic repeatered transmission system without E/O and O/E signal transducers. It is therefore desirable to incorporate full-optical loopback switching facilities in a repeatered fiber optic transmission system where the direct light amplification technique is employed.

SUMMARY OF THE INVENTION

It is therefore an object of the present invention to provide a repeater station having full-optical loopback switching functions for a repeated fiber optic transmission system where optical signals are amplified using the direct light amplification technique.

According to the present invention, there is provided a repeater station for a fiber optic transmission system. The repeater station has first and second repeaters of identical structure for relaying optical signals travelling in opposite directions. Each of the first and second repeaters comprises a first fiber optic section doped with a substance of rare-earth group for receiving an optical signal from a first fiber optic transmission line. A first excitation source generates excitation light energy and injects it into the first fiber optic section for causing light amplification to occur therein. A second fiber optic section, doped with such a rare-group substance, transmits an amplified version of the optical signal to a second fiber optic transmission line. A second excitation source generates excitation light energy and injects it into the second fiber optic section for causing light amplification to occur therein. An optical coupler is connected between the first and second fiber optic sections. Each repeater further includes a fiber optic loopback circuit which is connected at one end through the optical coupler of the repeater to the output of the first fiber optic section of the same repeater and connected at the other end through the optical coupler of the other repeater to the input of the second fiber optic section of that other repeater. An optical shutter is connected in the fiber optic loopback circuit for normally blocking the loopback circuit. In each repeater, an absence-of-signal detector monitors the first fiber optic transmission line. On detecting that there is no optical signal in the first fiber optic transmission line, the absence-of-signal detector of each repeater operates the optical shutter of the other repeater to establish a path through the fiber optic loopback circuit of the other repeater and deactivating the excitation source of that other repeater for signalling the emergency to an adjacent repeater station through the second fiber optic transmission line.

BRIEF DESCRIPTION OF THE DRAWINGS

The present invention will be described in further detail with reference to the accompanying drawings, in which.

DETAILED DESCRIPTION

Figure 1:
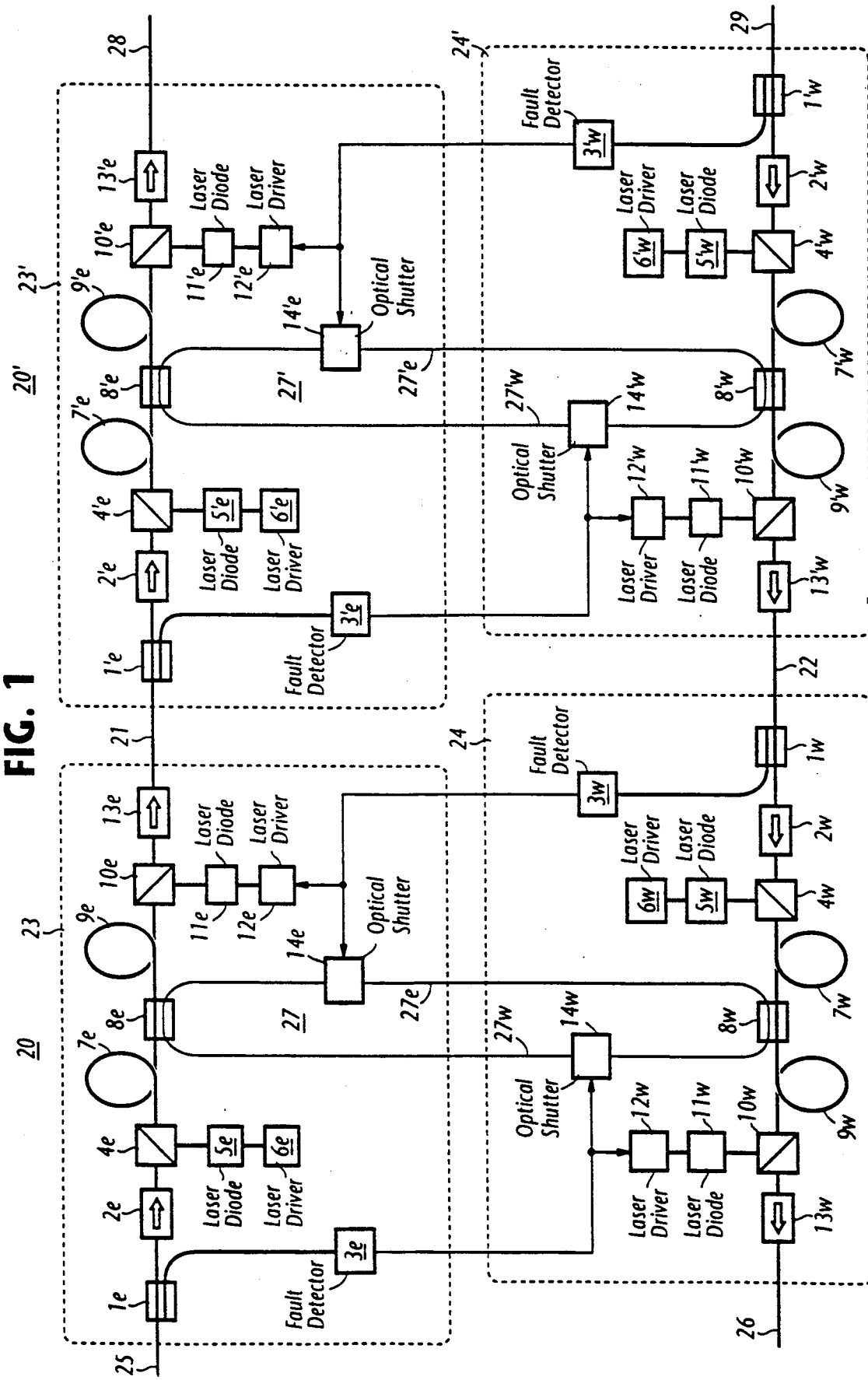
FIG. 1 is a block diagram of a repeatered optical transmission system according to the present invention.

In FIG. 1, two repeater stations 20 and 20' are illustrated as comprising part of the fiber optic transmission system of the present invention. These repeater station are of exactly identical construction and interconnected by optical fibers 21 and 22. Repeater station 20 comprises a pair of repeater units 23 and 24 of exactly identical structure respectively provided for eastward and westward directions of transmission. The elements comprising the eastward repeater 23 are marked by numerals attached with the letter "e" and those of the westward repeater 24 are marked by numerals attached with the letter "w".

In the repeater station 20, the eastward repeater 23 comprises an optical coupler 1e that provides optical coupling of an eastward incoming optical fiber 25 to an optical isolator 2e and a fault (absence-of-signal) detector 3e. The output of isolator 2e is coupled to an optical combiner or multiplexer 4e where it is combined with excitation energy of a particular wavelength from a laser diode 5e driven by a laser driver 6e. The combined optical output is coupled to the input end of an erbium-doped optical fiber section 7e which directly amplifies the signal component by raising its energy to a higher level by interaction with the excitation light energy component as it travels forwards through the doped fiber section 7e. On leaving the output end of fiber section 7e, the amplified optical signal is coupled through a first path of an optical coupler 8e to the input end of an erbium-doped optical fiber section 9e, where it is amplified by excitation light energy injected backwards into the fiber by an optical multiplexer 10e. This excitation energy is supplied from a laser diode 11e which is controlled by a laser driver 12e. The signal amplified by the fiber 9e is passed through multiplexer 10e and an isolator 13e and transmitted through optical fiber 21 to the repeater station 20'.

In a similar fashion, the westward repeater 24 of repeater station 20 comprises an optical coupler 1w that connects optical fiber 23 to an isolator 2w and a fault detector 3w. The output of isolator 2w is multiplexed by a multiplexer 4w with excitation energy from a laser diode 5w driven by a laser driver 6w. The combined optical output is coupled to the input end of an erbium-doped optical fiber section 7w for amplifying the signal component with the excitation light energy as it travels forwards through the fiber section 7w. On leaving the fiber 7w, the amplified signal is passed through a first path of an optical coupler 8w and entered into an erbium-doped optical fiber section 9w where it is amplified by excitation energy from a laser diode 11w injected backwards into the fiber by a multiplexer 10w. Laser diode 11w is controlled by a laser driver 12w. The amplified signal is passed through multiplexer 10w and an isolator 13w and transmitted through optical fiber 26 to an adjacent westward repeater station, not shown.

A first loopback circuit 27e is connected between the output of a second path of optical coupler 8e and the input of a second path of optical coupler 8w, and a second loopback circuit 27w is connected between the output of the second path of optical coupler 8w to the input of the second path of optical coupler 8w to form a loop 27. Optical signal supplied to each of the first and second paths of optical couplers 8e and 8w is coupled to the other path.

While the provision of each coupler 8e (8w) presents an insertion loss (approximately 3 dB) to the signal travelling through it, the direct amplification of signal by the preceding erbium-doped fiber section 7e (7w) prevents the output of the coupler from reducing to a level lower than that required for the succeeding erbium-doped fiber section 9e (9w) to produce a sufficient transmission output power.

The loopback circuits 27e and 27w are normally cut off by optical switches or shutters 14e and 14w. Fault detector 3e monitors the optical fiber 25 and feeds a turn-on signal to shutter 14w and a turn-off signal to laser driver 12w when a failure is detected in the transmission medium 25. When this occurs, a loopback path is established between erbium-doped fiber sections 9e and 7w through the loopback circuit 27w, while laser diode 11w ceases to excite the erbium-doped fiber section 9w. Since the cessation of excitation of laser diode 11w can be meant as an absence-of-signal condition on transmission medium 26, the faulty condition of transmission medium 25 is signalled from repeater station 20 through transmission medium 26 to an adjacent westward repeater station. In like manner, if a failure occurs in the transmission medium 22, fault detector 3w responds to it by applying a turn-on signal to shutter 14e and a turn-off signal to laser driver 12e so that a loopback path is established between erbium-doped fiber sections 7e and 9w through the loopback circuit 27e, while laser diode 11e ceases to excite the erbium-doped fiber section 9e for signaling the emergency through transmission medium 21 to repeater station 20'.

Repeater station 20' comprises an eastward repeater 23' and a westward repeater 24'. In the eastward repeater 23', optical coupler 1'e provides the coupling of optical fiber 21 to isolator 2'e and fault detector 3'e. The output of isolator 2'e is combined by multiplexer 4'e with excitation energy from laser diode 5'e driven by laser driver 6'e. The combined optical output is entered into erbium-doped optical fiber section 7'e for direct amplification of the signal. On leaving the fiber section 7'e, the amplified signal is passed through coupler 8'e to erbium-doped optical fiber section 9'e, where it is amplified by excitation light energy injected backwards into the fiber by optical multiplexer 10'e. This excitation energy is supplied from laser diode 11'e controlled by laser driver 12'e. The signal amplified by the fiber section 9'e is passed through multiplexer 10'e and an isolator 13'e and transmitted through optical fiber 28 to an adjacent eastward repeater station, not shown.

In a similar fashion, in the westward repeater 24', optical coupler 1'w provides the coupling of an incoming optical fiber 29 to isolator 2'w and fault detector 3'w. The output of isolator 2'w is combined by multiplexer 4'w with excitation energy from laser diode 5'w driven by laser driver 6'w. The combined optical output is coupled to erbium-doped optical fiber section 7'w for amplifying the signal component with the excitation light energy, the amplified signal being passed through optical coupler 8'w and entered into erbium-doped optical fiber section 9'w for direct amplification by excitation energy from laser diode 11'w injected backwards into the fiber section 9'w by multiplexer 10'w. Laser diode 11'w is controlled by laser driver 12'w. The amplified signal is passed through multiplexer 10'w and isolator 13'w and transmitted through fiber optic transmission medium 22 to repeater station 20.

As in the case of repeater station 20, a loop of optical fiber 27' is connected to optical couplers 8'e and 8'w to establish loopback circuits 27'e and 27'w. These loopback circuits are normally cut off by shutters 14'e and 14'w, respectively. Fault detector 3'e of repeater 23' monitors the transmission medium 21. If a failure is detected in the transmission medium 21, it feeds a turn-on and a turn-off signal, respectively, to the shutter 14'w and laser driver 12'w of the other repeater 24' to establish a loopback path between the doped fiber sections 9'e and 7'w through the loopback circuit 27'w, while deactivating laser diode 11'w of the other repeater. In like manner, fault detector 3'w of repeater 24' monitors the transmission medium 29 and feeds a turn-on and a turn-off signal, respectively, to the shutter 14'e and laser driver 12'e of the other repeater when a failure is detected in the transmission medium 29 to establish a loopback path between the doped fiber sections 7'e and 9'w through the loopback circuit 27'e while deactivating the laser diode 11'e of the other repeater.

Figure 2:
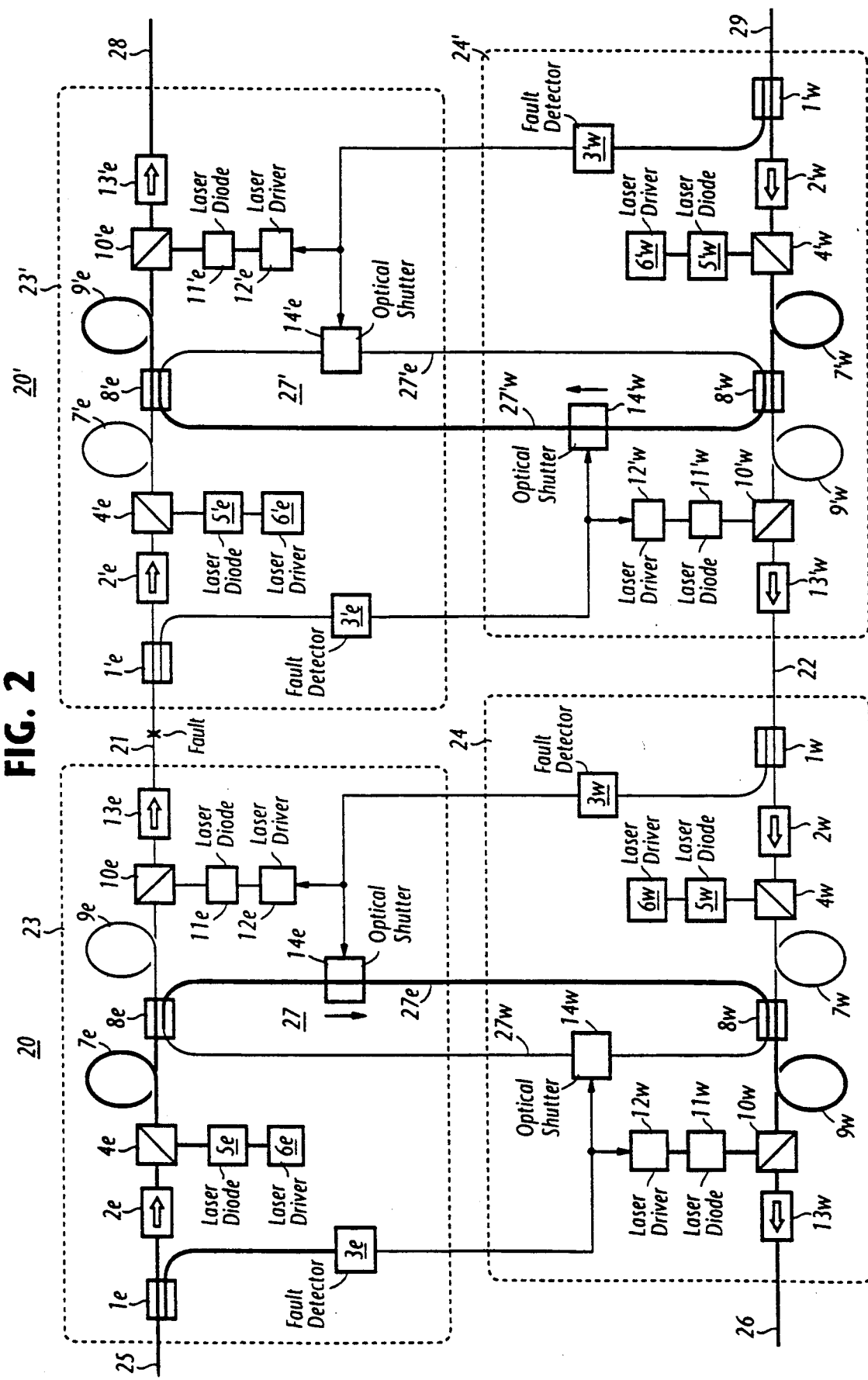
FIG. 2 is a block diagram of the system showing loopback routes established during a failure in a fiber optic transmission medium between adjacent repeater stations.

The operation of the system will be visualized with reference to FIG. 2.

Under normally working conditions, erbium-doped fiber sections 7e, 9e and 7'e, 9'e are cascaded in an eastward route from repeater station 20 to repeater station 20' for amplification of signals received from fiber 26 for transmission via medium 21 to medium 28, and in the westward route erbium-doped fiber sections 7'w, 9'e and 7w, 9w are cascaded for amplification of signals received from transmission medium 29 for transmission via medium 22 to medium 26.

Assume that optical fiber 22 has failed as indicated by a mark "x" in FIG. 2. Fault detector 3′e at repeater station 20′ detects this failure and turns the shutter 14′w on to establish a loopback path through the loopback circuit 27′w as indicated by a thick line, while deactivating laser diode 11′w. Therefore, the erbium-doped fiber sections 7′w and 9′e are connected by loopback circuit 27′w and the westward signal from transmission medium 29 is looped back to transmission medium 28.

With the laser diode 11′w being deactivated, fault detector 3w at repeater station 20 senses that there is no signal arriving on incoming transmission medium 22 and interprets this condition as a transmission failure and turns shutter 14e on and deactivates laser diode 11e. The erbium-doped fiber sections 7e and 9w are therefore connected through the loopback circuit 27e (thick line) and the eastward signal from transmission medium 25 is looped back to transmission medium 26.

If a failure occurs in transmission medium 22, loopback paths are established in both repeater stations in a similar manner. In this case, it is the fault detector 3w that first detects the faulty condition to set up the loopback path in repeater station 20, and deactivates laser diode 11e for signaling the faulty condition to the repeater station 20′.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A repeater station for a fiber optic transmission system, said repeater station having first and second repeaters of identical structure for relaying optical signals travelling in opposite directions, each of said first and second repeaters comprising:

a first fiber optic section doped with a substance of rare-earth group for receiving an optical signal from a first fiber optic transmission medium;

means including a first excitation source for generating excitation light energy and injecting the energy into said first fiber optic section for causing light amplification to occur therein;

a second fiber optic section doped with said substance for transmitting an amplified version of the optical signal to a second fiber optic transmission medium;

means including a second excitation source for generating excitation light energy and injecting the energy into said second fiber optic section for causing light amplification to occur therein;

an optical coupler connected between said first and second fiber optic sections;

a fiber optic loopback circuit connected at one end thereof through the optical coupler of the repeater to the output of the first fiber optic section of the repeater and connected at the other end thereof through the optical coupler of the other repeater to the input of the second fiber optic section of the other repeater;

an optical shutter connected in said fiber optic loopback circuit for normally blocking said loopback circuit; and absence-of-signal detector means for monitoring said first fiber optic transmission medium, and on detecting that there is no optical signal present in said first fiber optic transmission medium, operating said optical shutter of the other repeater to establish a path through said fiber optic loopback circuit of the other repeater and deactivating said excitation source of the other repeater.

2. A repeater station as claimed in claim 1, wherein the energy from said first excitation source is injected into said first fiber optic section in the same direction as the direction of transmission of optical signal and the energy from said second excitation source is injected into said second fiber optic section in a direction opposite to the direction of transmission of optical signal.

3. A repeater station for a fiber optic transmission system, said repeater station having first and second repeaters of identical structure for relaying optical signals travelling in opposite directions, each of said first and second repeaters comprising:

a first optical coupler having first and second output for coupling a first fiber optic transmission medium to the first and second output of the coupler;

a first optical isolator connected to the first output of said first optical coupler;

first optical combiner means having a first input connected to the output of said first optical isolator and a second input;

a first fiber optic section doped with a substance of rare-earth group, said first fiber optic section having an input end thereof connected to the output of said first optical combiner means;

a first excitation source for coupling excitation light energy to the second input of said first optical combiner means for causing light amplification to occur in said first fiber optic section;

a second optical coupler having first and second inputs and first and second outputs for coupling an optical signal from said first fiber optic section through the first input thereof to the first and second outputs thereof and coupling an optical signal through said second input thereof to the first output thereof;

a second fiber optic section doped with said substance, the second fiber optic section having an input end thereof connected to the first output of the second optical coupler;

a second excitation source for generating excitation light energy;

second optical combiner means connected to the output end of said second fiber optic section for injecting the energy generated by the second excitation source into the second fiber optic section through the output end thereof for causing light amplification to occur therein;

a second optical isolator connected between the output of said second optical combiner means and a second fiber optic transmission medium;

a fiber optic loopback circuit connected at one end thereof to the second output of the second optical coupler of the repeater and connected at the other end thereof to the second input of the second optical coupler of the other repeater;

an optical shutter connected in said fiber optic loopback circuit for normally blocking said loopback circuit; and an absence-of-signal detector connected to the second output of said first optical coupler for monitoring said first fiber optic transmission medium, and on detecting that there is no optical signal present in said first fiber optic transmission medium, operating said optical shutter of the other repeater to establish a path through said fiber optic loopback circuit of the other repeater and deactivating said excitation source of the other repeater.

* * * * *